United States Patent
Huang

(10) Patent No.: US 9,690,942 B2
(45) Date of Patent: Jun. 27, 2017

(54) SIO DEVICE WITH SPI BUS GATEWAY CONTROLLER FOR WRITE PROTECTION

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Hung-Chi Huang, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 434 days.

(21) Appl. No.: 14/520,996

(22) Filed: Oct. 22, 2014

(65) Prior Publication Data

US 2016/0117508 A1  Apr. 28, 2016

(51) Int. Cl.
| | | |
|---|---|---|
| G06F 9/00 | (2006.01) | |
| G06F 21/57 | (2013.01) | |
| G06F 13/40 | (2006.01) | |
| G06F 21/79 | (2013.01) | |
| G06F 21/62 | (2013.01) | |
| G06F 9/44 | (2006.01) | |

(52) U.S. Cl.
CPC ........ *G06F 21/572* (2013.01); *G06F 13/4022* (2013.01); *G06F 21/79* (2013.01); *G06F 9/4401* (2013.01); *G06F 21/629* (2013.01)

(58) Field of Classification Search
CPC .. G06F 21/572; G06F 21/629; G06F 13/4022; G06F 9/4406
See application file for complete search history.

(56) References Cited

U.S. PATENT DOCUMENTS

2011/0078408 A1* 3/2011 Ishida ................... G06F 21/572
                                                              711/216
2014/0359788 A1* 12/2014 Laine .................... G06F 21/572
                                                              726/27

* cited by examiner

*Primary Examiner* — Ernest Unelus
(74) *Attorney, Agent, or Firm* — Steven Reiss

(57) ABSTRACT

A serial input/output (SIO) device with a serial peripheral interface (SPI) bus gateway controller. The gateway controller retrieves operation code (opcode) from a signal from the SPI bus and an address number from the signal; the gateway controller further compares the retrieved opcode with a restrict opcode, the retrieved address number with a restrict address number. When either the retrieved opcode matches the restrict opcode, or the retrieved address number matches the restrict address number, the gateway controller blocks the signal.

14 Claims, 3 Drawing Sheets

SIO DEVICE WITH SPI BUS GATEWAY CONTROLLER FOR WRITE PROTECTION

FIELD

The subject matter herein generally relates serial peripheral interface (SPI) bus gateway controllers, and more specifically to a SPI bus gateway controller to provide write protection for software for a basic input/output system (BIOS).

BACKGROUND

In electronic devices that use a BIOS to boot into an operating system, running the BIOS during the booting process can encounter issues due to data corruption caused by a damaged or modified BIOS, a sudden power interruption, or other reasons. Therefore, improved BIOS write protection is needed.

BRIEF DESCRIPTION OF THE DRAWINGS

Implementations of the present technology will now be described, by way of example only, with reference to the attached figures, wherein.

DETAILED DESCRIPTION

Figure 1:
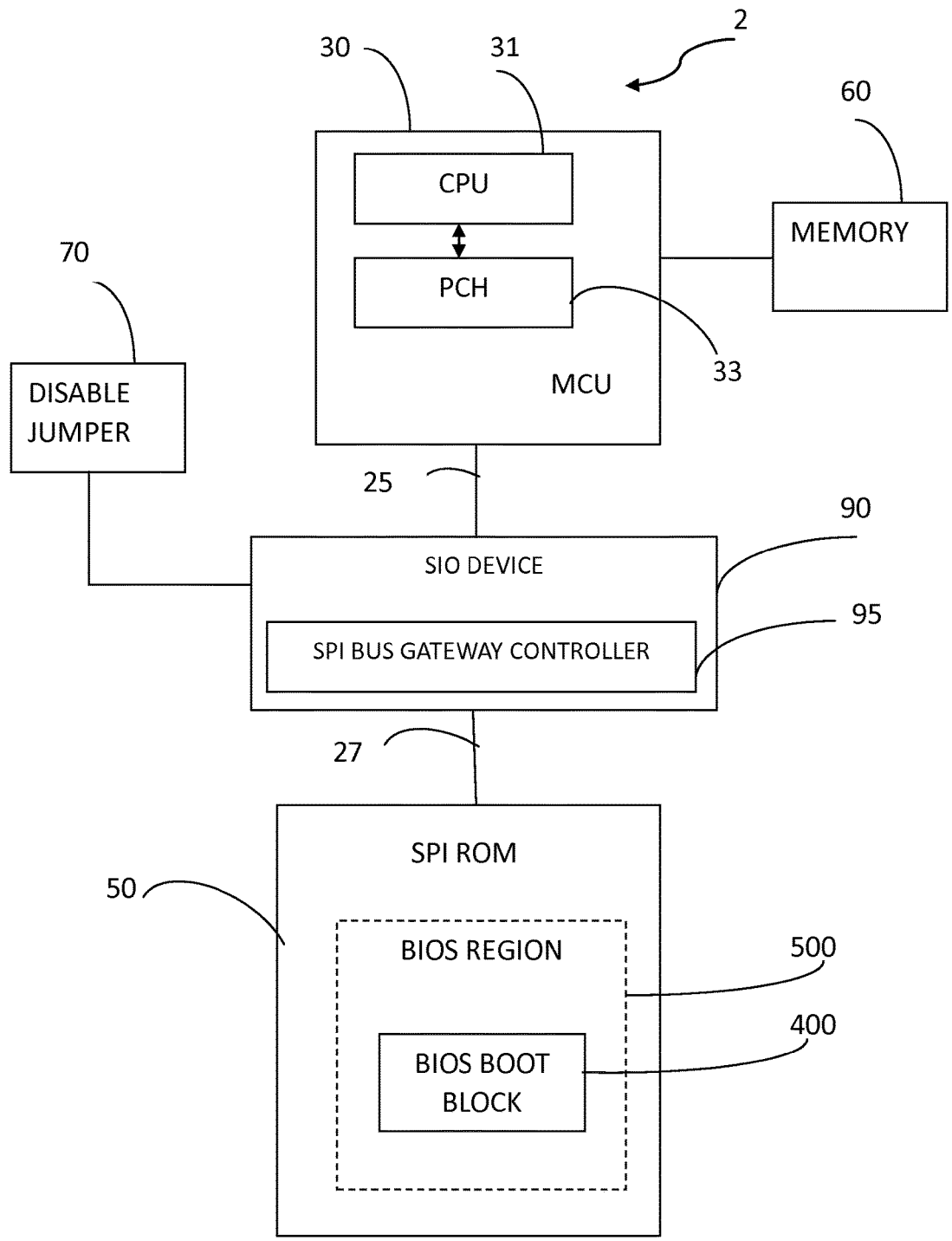
FIG. 1 is a block diagram of an electronic apparatus with a SIO device having a SPI bus gateway controller, in accordance with an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
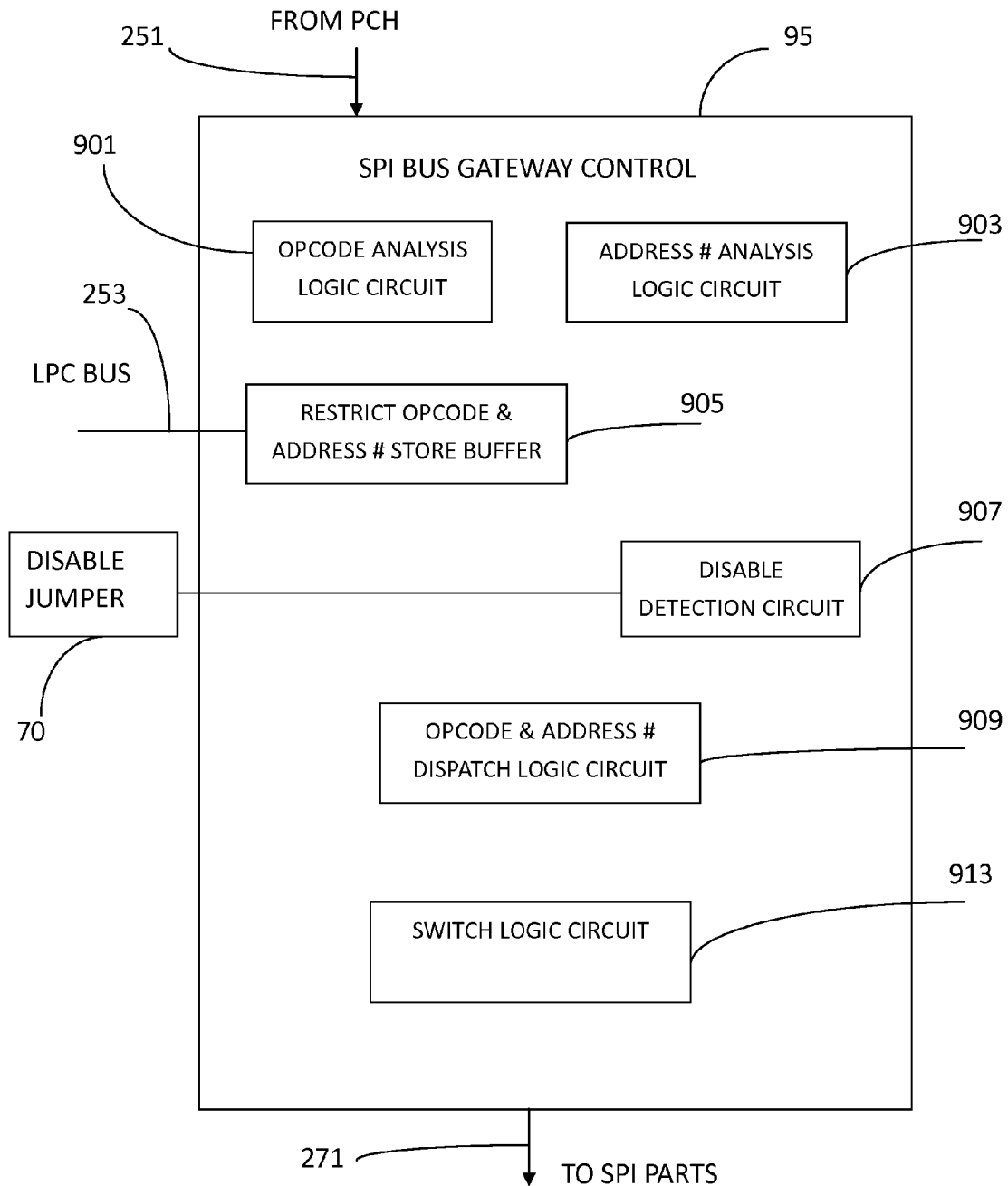
FIG. 2 is a block diagram of the SPI bus gateway controller for the SIO device in FIG. 1, in accordance with an embodiment.
Figure 3:
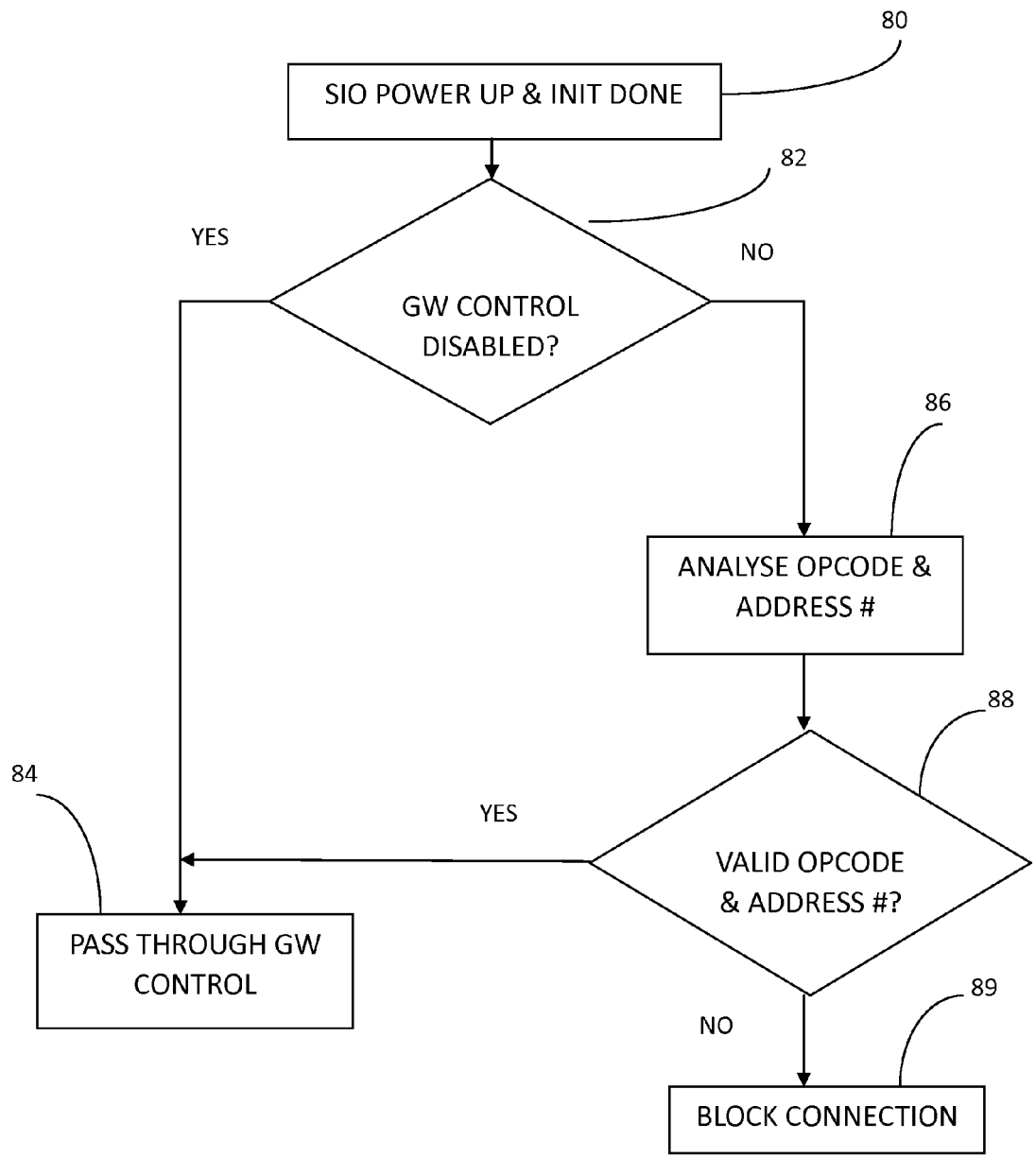
FIG. 3 is a flowchart showing a process of booting BIOS, together with using the SPI bus gateway controller of FIG. 1 or FIG. 2.

The present disclosure is described in relation to the accompanying FIGS. 1-3.

FIG. 1 illustrates an electronic apparatus 2 with a SIO device 90 having a SPI bus gateway controller 95. In this embodiment, the apparatus 2 further includes a micro controller unit (MCU) 30 coupled to a memory 60. The micro controller unit 30 has a central processing unit (CPU) 31 and a platform controller hub (PCH) 33 coupled to the CPU 31. The electronic apparatus 2 also includes a SPI random access memory (ROM) 50, such as a SPI flash for storing a BIOS, the SPI ROM 50 can have a BIOS region 500 to store the BIOS including its BIOS BOOT BLOCK 400. The MCU 30 is coupled to the SPI ROM 50 via the SIO device 90, through connections 25 and 27. Each of the connection 26 or 27 can be SPI bus connection. A disable jumper 70 is can be provided to the SIO device 90 to enable or disable the SPI bus gateway controller 95.

FIG. 2 illustrates a diagrammatic view of functional blocks for the SPI bus gateway controller 95, according to an embodiment. In the embodiment, the SPI bus controller 901 includes an operation code (opcode) analysis logic circuit 901, an address number analysis logic circuit 903, a restrict opcode and address number store buffer 905, a disable detection circuit 907, an opcode and address number dispatch logic circuit 909, and a switch logic circuit 913.

The SPI bus gateway controller 95 is coupled to the MCU 30 via the connection 25, in the instant embodiment, the connection 25 can be a SPI bus connection 251 from PCH 33. When receiving a SPI bus signal from the PCH 33, here, the signal can be a command set directing at the BIOS in the SPI ROM 50, the opcode analysis logic circuit 901 analyzes and retrieves an opcode from the signal. The address number analysis logic circuit 903 will analyzes and retrieves an address number or memory address where certain part of the BIOS is stored at, part of the BIOS at the address number could be modified if the command contained in the signal is carried out. The restrict opcode and address number store buffer 905 stores restrict an opcode or a number of opcodes that are not allowed to operate on the BIOS, and address numbers of the BIOS where modifications are not allowed for the part of the BIOS stored at the addresses. In one embodiment, the restrict opcode and address number store buffer 905 is connected by a low pin count (LPC) bus connection 253 to pre-store the restrict opcode or opcodes and address numbers of the BIOS. The opcode and address number dispatch logic circuit 909 compares the retrieved opcode and the retrieved address number with the restrict opcodes and address numbers stored in the restrict opcode and address number store buffer 905. When either the retrieved opcode matches the restrict opcode or any one of the restrict opcodes, or the retrieved address number matches one of the restrict address numbers, the switch logic circuit blocks the signal from the PCH 33, and when both the retrieved opcode does not match any one of the restrict opcodes, and the retrieved address number does not match any of the restrict address number, the switch logic circuit lets the signal from the SPI bus pass through to reach its destination or SPI parts to be performed via SPI connection 271 (an exemplary connection of connection 27). This way the software is protected against malicious hacking, computer virus, unwanted modifications, and other damaging factors.

The disable detection circuit 907 is coupled to the disable jumper 70 to detect the state of the disable jumper 70. Depending on a different state of the disable jumper 70 detected, the disable detection circuit 907 can enable or disable the SPI bus gateway controller 95. In case the SPI bus gateway controller 95 is disabled by the disable detection circuit 907, the logic circuits 901, 903, and 909 will not function as described, and the signal from the PCH 33 will let pass through by the switch logic circuit 913. However, in case the disable detection circuit 907 enables the SPI bus gateway controller 95, depending on a certain (or predefined) type of state of the disable jumper 70, the logic circuits 901, 903, and 909 will perform the functions as described.

Referring to FIG. 3, a flowchart of booting the BIOS stored in the SPI ROM 50, with the SPI bus gateway controller 95 is presented in accordance with an exemplary embodiment which is being thus illustrated. The example process is provided by way of example, as there are a variety of ways to carry out the method. The process described below can be carried out using the configurations illustrated in FIGS. 1 and 2, for example, and various elements of these figures are referenced in explaining example method. Each block shown in FIG. 3 represents one or more processes, methods or subroutines, carried out in the exemplary process of FIG. 3. Furthermore, the illustrated order of blocks is by example only and the order of the blocks can change according to the present disclosure. Additional blocks may be added or fewer blocks may be utilized, without departing from this disclosure. The exemplary process can begin at block 80.

At block 80, in the process of booting the BIOS, the SIO device 90 is powered and initialized. In block 82, the disable detection circuit 907 will check the state of the disable jumper 70 to decide whether the SPI bus gateway controller 95 should be disabled or not. In case the SPI bus gateway controller 95 should be and thus is disabled, in bock 84, the signal from the PCH 33 via the SPI bus connection 25 will pass through the SPI bus gateway controller 95 without be checked for the restrict opcode or address numbers.

On the other hand, when determined that the SPI bus gateway controller 95 is enabled, in block 86, the opcode analysis logic circuit 901 analyzes and retrieves an opcode from the signal, and the address number analysis logic circuit 903 will analyzes and retrieves an address number. In block 88, the opcode and address number dispatch logic circuit 909 compares the retrieved opcode and the retrieved address number with the restrict opcode or the opcodes and address numbers stored in the restrict opcode and address number store buffer 905 to decide whether both the retrieved opcode and the retrieved address number are valid. When either the retrieved opcode matches the restrict opcode or any one of the restrict opcodes, or the retrieved address number matches one of the restrict address numbers, the flow goes to block 89 and the switch logic circuit blocks the signal from the PCH 33 to prevent the opcode to be executed on the BIOS; and when both the retrieved opcode does not match the restrict opcode or any one of the restrict opcodes, and the retrieved address number does not match any of the restrict address number, as in block 84, the switch logic circuit lets the signal from the PCH 33 via the SPI bus connection 25 pass through to reach its destination to be performed.

The embodiments shown and described above are only examples. Many details are often found in the art such as the other features of a SPI memory containing a BIOS. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A gateway controller, comprising:
   an operation code (opcode) analysis logic circuit;
   an address number analysis logic circuit;
   an opcode and address number dispatch logic circuit; and
   a switch logic circuit,
   wherein the opcode analysis logic circuit retrieves an opcode from a signal via a serial peripheral interface (SPI) bus; the address number analysis logic circuit retrieves an address number from the signal; the opcode and address number dispatch logic circuit compares the retrieved opcode and the retrieved address number with a restrict opcode and a restrict address number; when either the retrieved opcode matches the restrict opcode, or the retrieved address number matches the restrict address number, the switch logic circuit blocks the signal, and when both the retrieved opcode does not match the restrict opcode and the retrieved address number does not match the restrict address number, the switch logic circuit lets the signal pass through.

2. The gateway controller of claim 1, further comprising a buffer, wherein the restrict opcode and the restrict address number are stored in the buffer.

3. The gateway controller of claim 1, wherein both the retrieved and the restrict opcode are for a basic input/output system (BIOS).

4. The gateway controller of claim 1, wherein both the retrieved and the restrict address numbers are memory addresses for a basic input/output system (BIOS).

5. A gateway controller, comprising:
   an operation code (opcode) analysis logic circuit;
   an address number analysis logic circuit;
   an opcode and address number dispatch logic circuit;
   a switch logic circuit;
   a disable jumper; and
   a detection circuit coupled to the disable jumper, wherein the detection circuit detects a state of the disable jumper and enables or disables the gateway controller depending on the detected state of the disable jumper,
   wherein, upon a condition that the gateway controller is enabled by the detection circuit, the opcode analysis logic circuit retrieves an opcode from a signal via a serial peripheral interface (SPI) bus; the address number analysis logic circuit retrieves an address number from the signal; the opcode and address number dispatch logic circuit compares the retrieved opcode and the retrieved address number with a restrict opcode and a restrict address number; when either the retrieved opcode matches the restrict opcode, or the retrieved address number matches the restrict address number, the switch logic circuit blocks the signal, and when both the retrieved opcode does not match the restrict opcode and the retrieved address number does not match the address number, the switch logic circuit lets the signal pass through; and
   wherein, upon a condition that the gateway controller is disabled by the detection circuit, the switch logic circuit lets the signal pass through.

6. The gateway controller of claim 5, further comprising a buffer, wherein the restrict opcode and the restrict address number are stored in the buffer.

7. The gateway controller of claim 5, wherein both the retrieved and the restrict opcode are for a basic input/output system (BIOS).

8. The gateway controller of claim 5, wherein both the retrieved and the restrict address numbers are memory addresses for a basic input/output system (BIOS).

9. A method for controlling a signal from a serial peripheral interface (SPI) bus to provide write protection, comprising:
   retrieving an operation code (opcode) from the signal using an opcode analysis logic circuit;
   retrieving an address number from the signal using an address number analysis logic circuit;
   comparing the retrieved opcode with a restrict opcode using an opcode and address number dispatch logic circuit; and
   comparing the retrieved address number with a restrict address number using the opcode and address number dispatch logic circuit;
   wherein the opcode analysis logic circuit retrieves the opcode from the signal via the serial SPI bus; the address number analysis logic circuit retrieves the address number from the signal; the opcode and address number dispatch logic circuit compares the retrieved opcode and the retrieved address number with the restrict opcode and the restrict address number; when either the retrieved opcode matches the restrict opcode, or the retrieved address number matches the restrict address number, the switch logic circuit blocks the signal, and when both the retrieved opcode does not match the restrict opcode and the retrieved address number does not match the restrict address number, the switch logic circuit lets the signal pass through.

10. The method of claim 9, wherein both the retrieved and the restrict opcode are for a basic input/output system (BIOS).

11. The method of claim 9, wherein both the retrieved and the restrict address numbers are memory addresses for a basic input/output system (BIOS).

12. The method of claim 9, further comprising:
   when both the retrieved opcode does not match the restrict opcode and the retrieved address number does not match the address number, letting the signal pass through.

13. The method of claim 12, wherein both the retrieved and the restrict opcode are for a basic input/output system (BIOS).

14. The method of claim 12, wherein both the retrieved and the restrict address numbers are memory addresses for a basic input/output system (BIOS).

* * * * *